May 23, 1933.   G. H. PFEFFERLE   1,911,126
SPLIT SLEEVE REPAIR DEVICE
Filed June 17, 1932   2 Sheets-Sheet 2
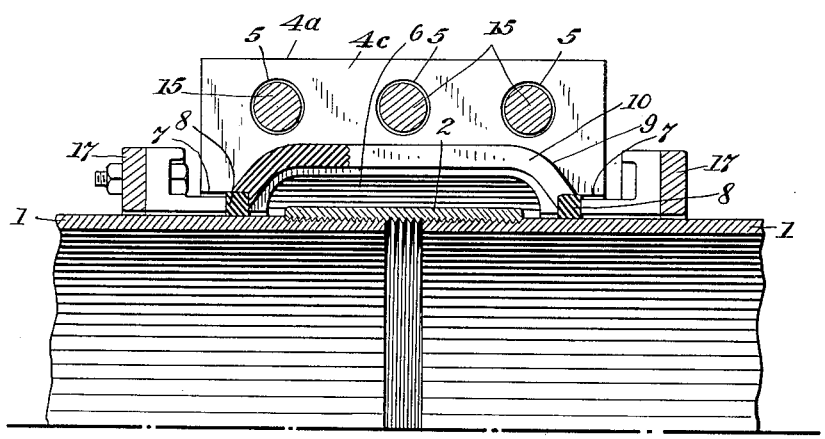
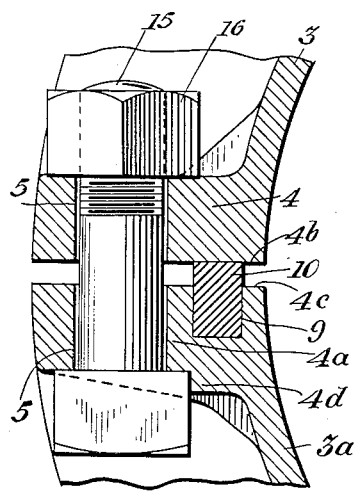
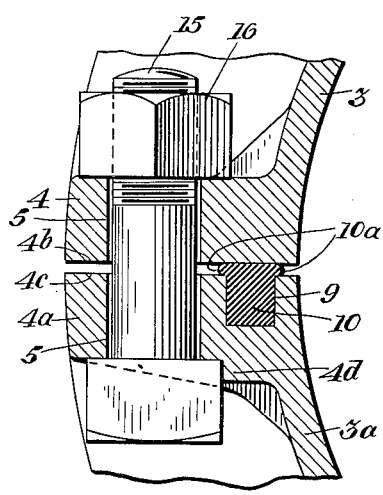
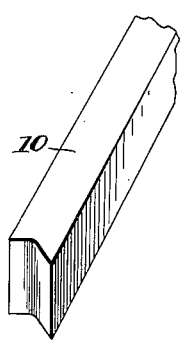
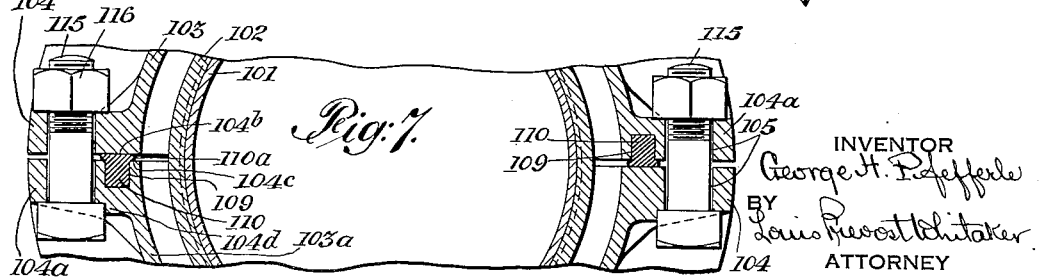
INVENTOR
George H. Pfefferle
BY
Louis Prevost Whitaker
ATTORNEY Patented May 23, 1933

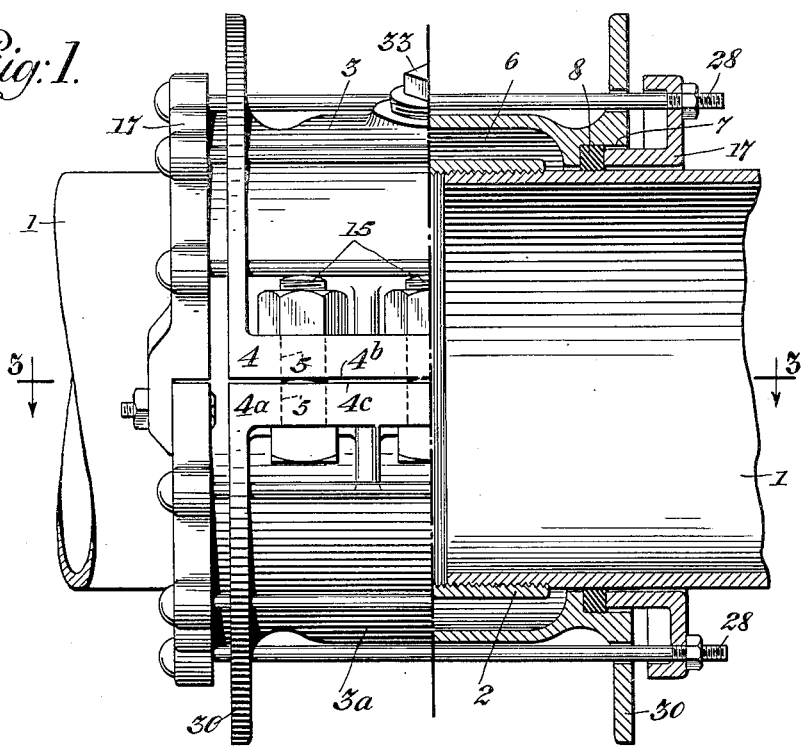
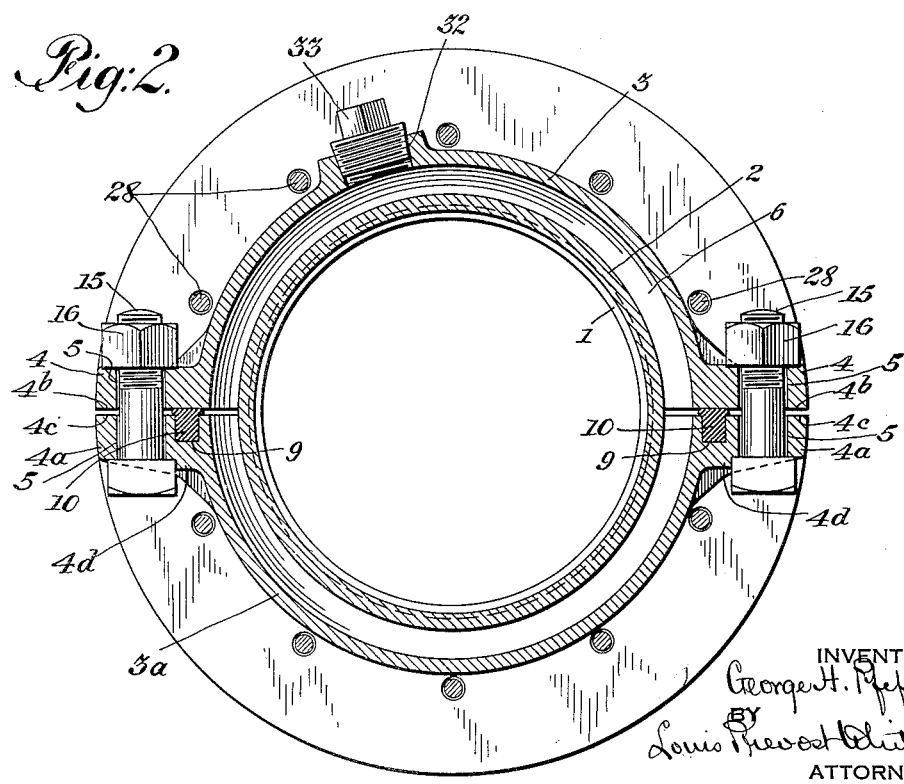

1,911,126

UNITED STATES PATENT OFFICE

GEORGE H. PFEFFERLE, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

SPLIT SLEEVE REPAIR DEVICE

Application filed June 17, 1932. Serial No. 617,724.

My invention consists in the novel features hereinafter described, reference being had to the accompanying drawings which show one embodiment of the invention, and a slight modification thereof, selected by me for purposes of illustration. and the said invention is fully disclosed in the following description and claim.

My invention is particularly applicable to what are known in the pipe coupling art as split sleeves, or split repair sleeves, which are intended to be placed around a coupling in a pipe line, and bolted up to prevent leakage in the enclosed joint without disturbing the joint and without interrupting the passage of gaseous or liquid material therethrough. These sleeves are formed in segments, usually in two parts, provided at their ends with packing recesses to receive end packings, which are subjected to pressure by suitable clamping rings, and the segments or halves of the sleeve are provided with lateral flanges, which are drawn together by side clamping bolts upon suitable packing extending from one end packing recess to the other.

The problem of this side packing for the sleeves has been given a great deal of study by the engineers engaged in the manufacture and installation of pipe couplings, in an effort to overcome certain difficulties which have been encountered and to provide a cheap, and thoroughly efficient and reliable side packing for these sleeves. Owing to the effect of changes of temperature on the length of the side clamping bolts, it is necessary to have a considerable body of elastic material, usually rubber packing, under a high degree of pressure, and to have this body of elastic material confined so that its natural tendency to "cold flow", and thus relieve the pressure acting upon it, will be prevented. On the other hand, the low price at which these sleeves must be marketed prohibits the employment of constructions requiring machining of the opposed clamping surfaces or parts thereof. Moreover, the side packings must follow more or less accurately the lateral enclosing walls of the sleeve segments, which in many instances present great difficulties to any attempts to machine grooves or interlocking grooves and ribs therein, except at prohibitory cost.

In carrying out my present invention, the sleeve segments which are preferably formed of cast iron or steel, or other suitable cast metal, are formed with opposed side flanges, the face of one of which is substantially plane, while the opposed face of the other side flange is provided with a groove, formed therein in the casting of the segment without machining, and extending from one end packing recess to the other, said groove having a very considerable cross sectional area. In connection with these flanges, and the usual clamping bolts for drawing them together, I employ a packing strip coextensive longitudinally with the length of the groove, of a width to substantially fit between the lateral faces of the groove, and of a thickness considerably greater than the depth of the groove, so that the packing strip will project a considerable distance, for example, one third, or one quarter, more or less of its thickness, beyond the outer face of grooved side flange, when not under compression. The depth of the groove also affords such an engagement with the side packing as to prevent the possibility of the packing being blown out by escaping gas or other fluid in assembling the sleeve around a leaky coupling or a leak in the pipe.

When the side bolts are drawn up as they must be, so as to bring the opposed faces of the side flanges into close proximity, the packing strips, which are usually formed of rubber or rubber compound, will be placed under great compression, and will be deformed, the main portion of the very considerable body of the packing being crowned into the groove and also lengthwise thereof and forced into firm sealing engagement with the bottom and side walls thereof and lengthwise into firm sealing engagement with the end packings, and securely held against the possibility of "cold flow" while the portions of the packing outside of the groove will be forced into sealing engagement with the opposed face of the other side flange, leaving a comparatively minute space between the flanges, adjacent to the exterior portions of the packing, where "cold flow" is at all possible. This limited amount of cold flow cannot relieve to any appreciable extent the main body of the packing from compression, and a very large body of elastic packing material is thus effectively maintained under a high state of pressure, between the side flanges while the cost of the joint can be kept within commercially practical figures, as well as machining avoided, and only one of the opposed clamping faces is recessed to receive the packing, the other face remaining plane. With such a large body of packing the applied pressure will force it into intimate contact with the engaged surfaces, which may be the usual surfaces imparted by the sand in casting, regardless of their irregularities, and thus effect a perfectly gas and liquid tight joint, capable of withstanding the highest commercial line pressures, which in some instances may be very great. Furthermore, with the packing receiving recess formed entirely in one only of the opposed side flanges, all difficulty in securing the proper registration between the faces of said flanges experienced in other structures is avoided.

In some instances the packing engaging faces of both the side flanges of one half or segment of the sleeve are plane faces, while the corresponding faces of the side flanges of the other half or segment are provided with the packing receiving grooves, while in other instances the faces of one side flange of each segment is plane and the other grooved, as hereinafter described.

While I have shown my invention as embodied in a split sleeve, to which it is particularly adapted, I wish it to be understood that I do not limit myself to this specific use.

My invention comprises certain novel features of construction and combination of parts hereinafter fully described and particularly pointed out in the claim.

Referring to the accompanying drawings, Fig. 1 is a side elevation, partly in section, showing a repair sleeve embodying my invention in operative position in connection with a pipe line and enclosing a coupling therein.

Fig. 2 represents a transverse section of the parts shown in Fig. 1.

Fig. 3 is a partial horizontal section on the line 3—3 of Fig. 1, with the rubber packing partly in section.

Fig. 4 is an enlarged detail sectional view illustrating a pair of the opposed side flanges, the interposed packing strip and one of the side clamping bolts, before the said bolts are tightened.

Fig. 5 is a similar view showing the same parts after the side bolts have been tightened.

Fig. 6 is a detail perspective view of a portion of one of the side packings.

Fig. 7 is a partial transverse sectional view of a split sleeve showing a slight modification.

In the drawings, 1, 1, represent two pipe sections of a pipe line, united in this instance by a screw collar, 2. 3, 3a, represent the segments or halves of the split sleeve, preferably formed of cast iron or malleable cast iron, each provided at each side with a clamping flange, 4, (or 4a) provided with bolt holes, 5, registering with those in the side flanges of the other segment. The interior of the sleeve provides a chamber, 6, of desired size and shape, to enclose a portion of a pipe in which there may be a leak, or any desired type of coupling for which the particular sleeve is designed. The specific embodiment shown could be used for the repair of a pipe, a welded joint, or a screw collar coupling, and the walls of the sleeve may obviously be made of sufficient diameter to enclose other forms of coupling, as the well known dresser coupling, or a bell and spigot coupling, if desired.

Each sleeve segment, 3, is provided at each end with a segmental end packing recessed portion, 7, so constructed that when the segments are united, annular recesses will be formed around the pipe sections to receive the end packings, 8, in the usual manner, and these packings, which are usually molded in circular form and cut to facilitate placing them around the pipe sections, are compressed by means of sectional clamping rings, or followers, 17, and by clamping bolts, 28 (usually through bolts connecting the rings) in any usual or preferred manner. The particular construction of the clamping rings and the clamping bolts therefor forms no part of my present invention.

In the form of my invention shown in Figs. 1 to 6 inclusive, the packing engaging faces, 4b, of the side flanges, 4, of segment, 3, are plane faces, which may be just as they come from the mold, although of course they could be machined if desired, although this is not necessary and would add to the cost of manufacture. The corresponding opposed faces, 4c, of the side flanges, 4a, of segments, 3a, are each provided with a longitudinal groove or recess, 9, of substantial depth and width extending substantially parallel to the inner surface of the wall of the segment body, from one of the end recesses, 7, to the other. These grooves are preferably of substantially uniform width throughout their length, and throughout their depth, and are preferably of rectangular shape in cross section, although this is not essential.

Each of the grooves, 9, receives a longitudinal side packing, 10, of elastic material, preferably of rubber or rubber compound, which is also preferably rectangular in cross section, of a width substantially equal to the width of the groove, 9, and of a thickness considerably greater than the depth of the groove, so that when inserted in the groove, the latter will enclose a considerable portion of the packing, preferably more than half, leaving approximately one third or one quarter, more or less, of the thickness of the packing projecting from the groove, in the uncompressed condition of the packing, as indicated in Fig. 4. The length of each packing strip is sufficient to extend from one of the end packing recesses, 7, to the other, so as to abut firmly at each end against one of the end packings, 8, as shown in the drawings, and the ends of the packing strips, 10, may be cut or otherwise formed so as to fit neatly against the adjacent faces of the end packings, 8, if desired.

It will be seen that in assembling the split sleeve around a leaky pipe or joint, the engagement between the side packings and the walls of the grooves or recesses, 9, in which they are supported, and so deeply embedded is such that the packings are prevented from being blown out laterally by the leaking gas or other fluid carried by the pipe line, which can only act on the inside face of the smaller portion of the packing, which projects from the groove, the larger portion of the packing lying entirely within the groove. This very greatly facilitates the assembling of the sleeve and drawing it tight. The assembling of the parts of the sleeve is also facilitated by the fact that the opposed side flanges have one plane face and one recessed face. There are no parts to bring into registration except the bolt holes for the side bolts.

When the side bolts, indicated at 15, and nuts, 16, as indicated in Figs. 1, 2 and 5, are tightened, the side flanges are brought close together, and the exterior portions of the side packings, which normally project from the grooves, 9, are to a very considerable extent crowded into the grooves, thus placing the elastic material of the packings under a very high degree of pressure, and forcing the packings into sealing engagement with the bottom and side walls of the grooves. The cross sectional area and density of the side packings is such, however, that they cannot be completely forced into the grooves. The outer faces of the packings will be forced into and maintained in sealing engagement with the plane faces, 4b, of the sleeve segment, 3. After the split sleeve is assembled around the pipe joints, and the segments are connected by the side bolts, the end packings, 8, are placed in the end packing recesses, 7, the clamping rings or followers, 17, 17, (preferably formed in sections) are assembled at the opposite ends of the sleeve, and drawn toward the sleeve, to compress the end packings and force them into sealing engagement with the adjacent ends of the side packings 10. I have shown through bolts, 28, extending through the registering bolt holes in the clamping rings, 17, and through registering bolt holes in reinforcing flanges, 30, 30, with which the sleeve segments are in this instance provided as the side and end clamping bolts are tightened, the end packings 8 form a seal between the end portions of the split sleeve and the pipe members which they surround, and the compression of the large body of rubber into side packings 10 not only seals the side flanges but also causes the side packings to increase in length, that is to say, to expand longitudinally, thus forcing the ends of the side packings into firm sealing engagement with the adjacent portions of the end packings 8, as will be readily seen, and brings about a better co-operation between the end packings and side packings and a more effective seal at the points of juxtaposition thereof than can be otherwise secured. The large body of rubber in the side packings also compensates for any springing or distortion of the sleeve segments which may bring the adjacent faces of the opposed side flanges out of parallelism when under tension, and insures a perfect side pack in all cases.

One of the sleeve segments, as 3, is conveniently provided with a threaded outlet aperture, 32, which may be left open during the application of the sleeve, to permit the escape of the leaking fluid until the sleeve bolts are fully tightened, when it can be closed by a plug, 33, or cut off cock, in a well known way. The lateral flanges, 4a, of the lower half or segment, 3a, of the sleeve, are conveniently provided with means, as a longitudinal bead or shoulder, 4d, to engage the heads of the side bolts, and hold the bolts from turning while the nuts, 16, are screwed up.

It will be obvious that the large body of packing material in the side packings within the grooves 9, is held against any possibility of cold flow. There will be a slight amount of cold flow of the small portion exterior to the grooves, 9, as indicated at 10a, 10a, in Fig. 5, but even this tendency to cold flow is resisted by the adjacent walls of the grooves, and the frictional engagement between the outer faces of the packings and the plane faces, 4b, of the side flanges, 4, and the construction prevents the possibility of any material loss of pressure in the packings, 10, due to cold flow, which would affect the tightness of the joint so formed, while the side packings provide such a large body of elastic material maintained under great pressure that the side packings will remain perfectly tight at all times.

In some instances, especially where the castings for the two sleeve segments can be made identical, I may provide each segment with a side flange having a plane face, while the other side flange is provided with the groove to receive the side packing. I have illustrated such a construction in Fig. 7, in which the parts corresponding with those shown in Figs. 1 to 6 inclusive are given the same reference numerals with the addition of 100. In this embodiment, the segment, 103, is provided with a side flange, 104, having a plane face, 104b, while the opposite flange, 104a, is provided with a side packing groove, 109, to receive a side packing, 110. The segment, 103a, is identical in construction and the parts are so assembled that the side packing held in the groove of the side flange of one segment will be opposite the side flange of the other segment, which has a plane face. The action of the side packings in this embodiment will be the same as previously described.

What I claim and desire to secure by Letters Patent is:—

In a repair device, the combination with a split sleeve provided at each end with an annular end packing recess and an end packing therein, said sleeve being formed of segments each provided at each edge thereof with a side flange, the opposed side flanges of said segments having the one a substantially plane face and the other a deep longitudinally disposed packing groove extending from one of said end packing recesses to the other, and communicating at each end with one of said end packing recesses, a pair of side packing strips of rubber substantially rectangular in cross-section, having a width substantially equal to the width of one of said grooves and a depth considerably greater than the depth of said groove and a length substantially equal to the length of said groove, means for compressing the end packing in said annular end packing recesses, clamping means engaging said opposed side flanges of the segments and clamping said side packing strips between them with great force, to force part of the projecting portions of said packings into said grooves and to expand said side packings laterally into sealing contact with the sides of said grooves and longitudinally into sealing engagement with the end packings, the portions of said side packings exterior to said grooves being forced into sealing engagement with the substantially plane face of the opposite side flange.

In testimony whereof I affix my signature.

GEORGE H. PFEFFERLE.